United States Patent
Byrne

(10) Patent No.: US 10,330,465 B2
(45) Date of Patent: Jun. 25, 2019

(54) SYSTEMS, METHODS, AND APPARATUSES FOR MEASURING DEFORMATION OF A SURFACE

(71) Applicant: Applied Research Associates, Inc., Albuquerque, NM (US)

(72) Inventor: Richard Baxter Byrne, Strafford, VT (US)

( * ) Notice: Subject to any disclaimer, the term of this patent is extended or adjusted under 35 U.S.C. 154(b) by 159 days.

(21) Appl. No.: 14/820,845

(22) Filed: Aug. 7, 2015

(65) Prior Publication Data

US 2016/0040984 A1 Feb. 11, 2016

Related U.S. Application Data

(60) Provisional application No. 62/035,109, filed on Aug. 8, 2014.

(51) Int. Cl.
*G01B 11/16* (2006.01)
*G06T 17/00* (2006.01)
(Continued)

(52) U.S. Cl.
CPC .............. *G01B 11/16* (2013.01); *G06T 7/507* (2017.01); *G06T 7/55* (2017.01); *G06T 2200/04* (2013.01); *G06T 2207/10016* (2013.01)

(58) Field of Classification Search
CPC .................................. G01B 11/16; G06T 7/55
See application file for complete search history.

(56) References Cited

U.S. PATENT DOCUMENTS

2008/0075328 A1 3/2008 Sciammarella
2009/0073428 A1* 3/2009 Magnus .................. B61K 9/08
356/237.1
(Continued)

FOREIGN PATENT DOCUMENTS

JP 2012093854 A 5/2012
WO WO 01/07864 A2 * 2/2001 ............. G01B 11/00
(Continued)

OTHER PUBLICATIONS

International Search Report and Written Opinion dated Nov. 16, 2015 pertaining to International PCT Application No. PCT/US2015/044274.
(Continued)

*Primary Examiner* — Gims S Philippe
*Assistant Examiner* — Mainul Hasan
(74) *Attorney, Agent, or Firm* — Dinsmore & Shohl LLP; Monika Jaensson

(57) ABSTRACT

The present invention regards a method for measuring displacement of a surface at a region of interest when the region of interest is exposed to a load. The method includes the steps of (1) evenly illuminating the surface; (2) by means of a camera capturing a first set of images comprising a first image of the surface, applying a load to the surface at the region of interest, and capturing a second image of the surface; and (3) transmitting the first and second image to a processing module of a computer, wherein the processing module: (a) includes data relating to the image capture, such as the spatial position and field of view of the camera relative to the surface when the images were captured; (b) generates a global perspective transform from selected regions out of the displacement area (c) performs a global image registration between the two images using perspective transform to align the images; (d) computes vertical pixel
(Continued)

shift and horizontal pixel shift between the first image and the second image for the region of interest; and (e) computes displacement of the region of interest between the images, in length units. The images are captured by the camera at an image camera position relative to the surface. In some embodiments two cameras are used, each capturing a single image from the same image camera position; in some embodiments multiple sets of images are captured by multiple cameras, from different perspectives.

16 Claims, 5 Drawing Sheets

(51) Int. Cl.
*H04N 5/349* (2011.01)
*G06T 7/00* (2017.01)
*G06T 7/507* (2017.01)
*G06T 7/55* (2017.01)

(56) References Cited

U.S. PATENT DOCUMENTS

| | | | |
|---|---|---|---|
| 2009/0268984 A1 | 10/2009 | Intwala | |
| 2010/0158322 A1 | 6/2010 | Weston et al. | |
| 2011/0009992 A1 | 1/2011 | Shkolnik et al. | |
| 2013/0063570 A1* | 3/2013 | Michopoulos | G01B 11/165 348/47 |
| 2013/0070048 A1* | 3/2013 | Huang | G01B 11/16 348/36 |
| 2013/0155061 A1* | 6/2013 | Jahanshahi | G06T 15/00 345/419 |

FOREIGN PATENT DOCUMENTS

| | | | | |
|---|---|---|---|---|
| WO | WO 0107864 A2 * | 2/2001 | | G01B 11/2416 |
| WO | WO-0107864 A2 * | 2/2001 | | G01B 11/2416 |
| WO | WO 2005103608 A1 * | 11/2005 | | G01B 11/2518 |
| WO | WO-2005103608 A1 * | 11/2005 | | G01B 11/2518 |

OTHER PUBLICATIONS

P.H.S. Torr and D.W. Murray, "The Development and Comparison of Robust Methods for Estimating the Fundamental Matrix," International Journal of Computer Vision 24(3), pp. 271-300, 1997.

W.F. Clocksin, K.F. Chivers, P.H.S. Torr, J. Quinta Da Fonseca, and P.J. Withers, "Inspection of Surface Strain in Materials Using Dense Displacement Fields," in 4th International Conference on New Challenges in Mesomechanics, (Aalborg), Aug. 2002.

J. Harvent, B. Coudrin, L. Brethes, Jean-Jose Orteu, M. Devy "Shape Measurement Using a New Multi-Step Stereo-DIC Algorithm That Preserves Sharp Edges." Experimental Mechanics, Society for Experimental Mechanics (SEM), 2015, 55(1), pp. 167-176.

J. Tyson, T. Schmidt and K. Galanulis, "Biomechanics Deformation and Strain Measurements with 3D Image Correlation Photogrammetry," Experimental Techniques, vol. 26, Issue 5, pp. 39-42, Sep. 2002.

Kamaluddin HJ. Talib and Mohd Raihan Taha, "Land Use Change Detection Using Digital Photogrammetry Case Study: Kundasang, Sabath, Malaysia." http://www.gisdevelopment.net/application/environment/overview/mi05_203.htm.

Chen, B.Q., Garbatov, Y and Guedes Scares, C., "Automatic Approach for Measuring Deformations in Complex Structures Using Photogrammetry Technique," Center for Marine Technology and Engineering (CENTEC), Instituto Superior Técnico, Technical University of Lisbon, Av. Rovisco Pais, 1049-001 Lisboa, Portugal.

Timothy Schmidt and John Tyson, "Dynamic Strain Measurement Using Advanced 3D Photogrammetry." Conference: 2003 IMAC-XXI: Conference & Exposition on Structural Dynamics.

Aerometrex, "Innovative, Quick and Efficient 3D Techniques for the Monitoring and Change Analysis of Construction and Industrial Sites Using Aero3Dpro." Oct. 31, 2012 http://aerometrex.com.au/blog/?tag=change-detection.

Schmidt, Timothy, Tyson, John, Konstantin, Galanulis, Revilock, Duane, and Melis, Matthew, "Full-Field Dynamic Deformation and Strain Measurements using High-Speed Digital Cameras", Proc. SPIE 5580, 26th International Congress on High-Speed Photography and Photonics, 174 (Mar. 25, 2005); doi:10.1117/12.567142.

Birgisson, Bjorn, Montepara, Antonio, Romeo, Elena, Roncella, Riccardo, Roque, Reynaldo, Tebaldi, Gabriele, "An Optical Strain Measurement System for Asphalt Mixtures", Materials and Structures (2009) 42:427-441.

Feng, C.L., Hung, Y.S., "A Robust Method for Estimating the Fundamental Matrix" Proc. VIIth Digital Image Computing: Techniques and Applications (2003).

* cited by examiner surface of interest r

SYSTEMS, METHODS, AND APPARATUSES FOR MEASURING DEFORMATION OF A SURFACE

BACKGROUND OF THE INVENTION

The present invention regards systems and processes for measuring displacement of a surface using photography.

There have been numerous studies of strain or displacement estimation using image processing but none that propose the combination of specific oblique camera placement (wherein the optical axis of the camera lens is positioned oblique to the surface plane) and image processing as a key element for measuring displacement of a free surface. Typically, studies have combined normal incident photos of material cross-sections and digital processing to measure compressive and tensile strain inside the material.

Typical practice for using photography to measure changes in surface topography, such as the displacement of a surface, generally employ photogrammetric techniques to construct digital three dimensional (3D) models representing 'before' and 'after' conditions of the surface under investigation, and then perform a subtraction of 'before' and 'after' surface coordinates to determine the change. These techniques are applicable to a broad range of surface shapes and are robust, but they have the disadvantage that photogrammetric construction of 3D models requires multiple images from multiple camera poses to construct each model, causing processing to be computationally intensive and thus time-consuming. Further, when assessing small displacements in relatively rough surfaces, errors introduced by sampling surface features from multiple angles may be large relative to the displacement of interest.

The systems and processes of the present invention provide a more accurate, less computationally intensive, faster process for measuring displacement of a surface, requiring fewer image samples than prior approaches. In addition, the present invention is less sensitive to signal-to-noise issues in measuring small average displacements over a rough surface.

GENERAL DESCRIPTION

The present invention regards a method for measuring displacement of a surface at a region of interest when the region of interest is exposed to a load. The method includes the steps of (1) evenly illuminating the surface; (2) by means of a camera capturing a first set of images comprising a first image of the surface, applying a load to the surface at the region of interest, and capturing a second image of the surface; and (3) transmitting the first and second image to a processing module of a computer, wherein the processing module: (a) includes data relating to the image capture, such as the spatial position and field of view of the camera relative to the surface when the images were captured; (b) uses regions of zero or known displacement in the second image and the matching region of the first image to construct a perspective transform (c) performs a global image registration between the two images using the perspective transform to align the images; (d) computes vertical pixel shifts as result of displacements normal to the surface and horizontal pixel shifts between the first image and the second image for the region of interest; and (e) computes displacement of the region of interest between the images, in length units. The images are captured by the camera at an image camera position relative to the surface. In some embodiments two cameras are used, each capturing a single image from the same image camera position; in some embodiments multiple sets of images are captured by multiple cameras, from different perspectives.

In some embodiments the first and second images are captured by a camera positioned relative to the surface so that its angular FOV includes a range of intersection angles with the surface and the camera optical rays of the lens between 5° and 45°.

The processing module of the method of the present invention performs perspective transform to align the images by generating a transform matrix using one image as the reference image, and applying the transform to the other image to bring the images into alignment The present invention also regards a system for measuring displacement of a surface at a region of interest when the region of interest is exposed to a load or undergoes a displacement from any other means. The system generally includes one or more light sources for illuminating the surface, one or more cameras for capturing first and second images of the surface, a load, and a processing module as described for the process hereinabove. In some embodiments the system of the disclosed technology includes a light source to evenly illuminate the surface, wherein the light source is provided at a light source position at an angle relative to the surface normal vector at a point of interest, which angle is less than the angle between the optical axis of the lens and the surface normal vector at the point of interest on the surface.

In certain embodiments the system of the present invention is installed under a truck flatbed, and the load is the portion of the vehicle supported by one tire. In other embodiments the system of the present invention is arranged under a train to measure track deflection of railroad ties, or under a vehicle or airplane to measure deflection on an airport runway.

DETAILED DESCRIPTION

The present invention regards a process and system for capturing one or more sets of a plurality of images of a region of interest on a surface to measure displacement when the surface is exposed to a load. The process includes capturing a first image of the surface from an image capture position, applying a load to the surface at the region of interest, and capturing a second image of the surface from the image capture position. The system and process of the present invention then, by means of a processing module of a computer, receive, calibrate and register the images, and calculate the pixel shift and absolute displacement in the region of interest resulting from the application of the load.

Images useful in the present invention are captured by one or more cameras, digital or film. In some embodiments the cameras are manual focus, fixed aperture cameras. A suitable camera may have manual or automatic gain and exposure times, as necessary to achieve adequate dynamic range for the region of interest when the camera is positioned at the image capture position.

Figure 1:
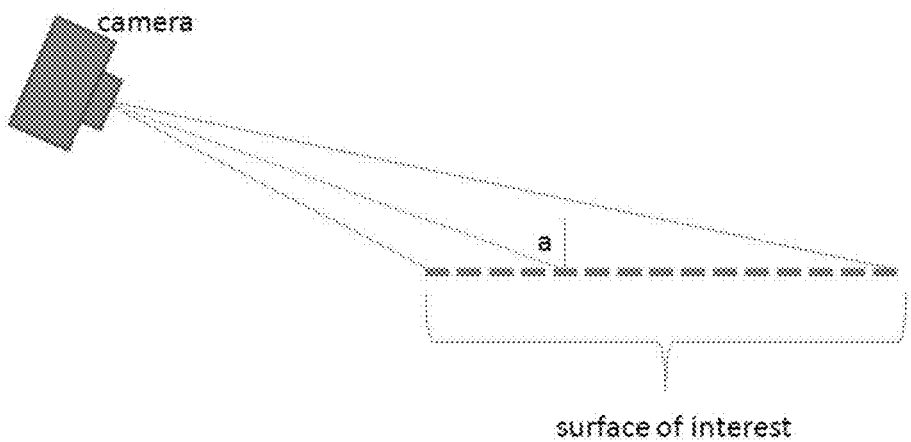
FIG. 1 depicts an embodiment of the system of the present invention, with a camera at a camera position near a region of interest

As shown in FIG. 1, the camera or cameras are spatially positioned relative to the region of interest at one or more image capture positions, so that the optical axis of the camera lens is positioned at a certain image camera position oblique to the surface plane so that its angular FOV includes a range of intersection angles with the surface of interest between 5° and 45°. These camera center to surface vectors can include a higher range of angles, from 0° to 90°, which will not disrupt the computation regions in the optimal range. In some embodiments the camera(s) are positioned relative to the surface so that the surface takes up the entire image frame, or a portion thereof so to include thousands of pixels or more in the region of interest. For the images in each image set, the camera(s) are in the same spatial position relative to the surface and the region of interest, with the angular FOV at the same angle $\alpha$ between the optical axis of the lens and the surface normal vector at a point of interest on the surface In the system of the present invention, the camera position and optical settings are substantially the same for each set of images. Thus, the camera(s) will have the same optical settings, being focused at the same distance, where the lenses are set to the same focal length and aperture, resulting in images having nominal if any difference in average intensity due to lighting, exposure and gain.

The focal ratio or f-number of the camera and its aperture should be set so that the near and far sections of the region of interest are in focus when the camera is in the image capture position. A setting of f/5 is suitable, and settings of f/10 or higher are preferred. The higher f-number on the camera will allow better focus throughout the image leading to computation of the displacement to highest level allowed by the pixel density which can be the physical distance represented by ⅓ to up to ¹⁄₁₀ a pixel depending on the surface texture. When the camera is in the image capture position, the combination of camera aperture and focal distance should extend the depth of field across the surface at the region of interest. Thus, when the camera is set at an angle to the surface, the distance to near and far points in the field of view may vary from 1:1.2 to 1:5 or more. A small aperture setting (e.g., f/12) can make the near and far points on the surface appear in focus in the image.

In the process of the present invention, the surface may be evenly illuminated to provide necessary intensity variation of shadowed regions (features) on the surface which appear on the images. However, even illumination from diffuse, natural, overhead light or multiple source light is preferred to minimize dominant point source reflection which results from strong single light sources at fixed locations, which can appear as reflections on a surface which moves as the surface is loaded and displaced; such reflections could be mistaken for displacement of the surface by the processing module of the present invention.

In some embodiments of the process and system of the present invention, the surface is illuminated by natural or artificial lighting to minimize strong gradients (shadow boundaries) in the region of interest on the surface. The lighting angle should be high enough so that shadows from irregularities in the surface are not visible to the camera, and sufficiently intense to improve the image quality and decrease thermal blooming and high gain (causing graininess in the image). Lighting may be provided naturally by the sun, and artificially by multiple light bulbs, LEDs or an on-camera or off-camera flash. Light may also be reflected to the region of interest from a parabolic reflector, a surface or dispersed with white fabric. The light source is provided at a light source position, which may be at an angle $\beta$ relative to the surface normal vector at the point of interest, wherein the angle $\beta$ is less than the camera angle $\alpha$.

The load may be any weight bearing object applied to the surface. For example, loading a truck axel to depress pavement when the tire is positioned in a region of interest. This load, positioned on the region of interest, may cause deflection of the road surface—the depth and breadth of the deflection basin from an axel load of 9,000 lbs. indicates road substructure conditions useful in other predictive models In some embodiments of the process and system of the present invention a first camera captures the first image, and a second camera captures the second image of an image set, wherein each camera is moved to capture an image of the region of interest on the surface at the image camera position. In this embodiment it is useful if the cameras are the same camera model, and the lenses of each camera are set to the same nominal settings (e.g., f-number, aperture, focal length).

In this embodiment the load applied to the surface may be coupled with, and may move with, the second camera, so that the load is applied at the region of interest when the second camera is at the image capture position; alternatively, it may be uncoupled with the second camera, still applying load at the region of interest when the second camera is at the image capture position. Likewise, in some embodiments multiple light sources may be provided, each light source being coupled with the first or second camera, respectively, so that it moves to the light source position and illuminates the region of interest when the respective camera is at the image capture position. In this embodiment, the first and second light sources should provide the same illumination at the region of interest when its associated camera is at the image camera position. The camera, load and/or light source may be coupled by any solid structure, maintaining the elements in their respective positions relative to the region of interest, as herein described, or independently pivoting the elements into their respective positions for image capture.

In some embodiments, a second or additional sets of images of the region of interest may be captured by means of one or more cameras, with each image of an image set being captured from the same spatial position, with the same settings and illumination, and wherein each set of images are captured from a different spatial position.

The process and systems of the present invention further include a processing module of a computer to receive, calibrate and register the images, and calculate the pixel shift and displacement in the region of interest resulting from application of a load. Images are scanned into or directly transmitted to the processing module.

The processing module receives and stores data including the geometric measurements of the image capture position (spatial position of the camera relative to the surface), the camera angle α, and the camera focal length, FOV and aperture; in some embodiments the processing module also receives topography, either measured or computed, of the surface as a function of pixel coordinates. This data may be input by a user, or may be received from the camera.

In some embodiments, particularly when images in a set may be captured from slightly different image capture positions, using the data received regarding the image capture position and camera settings the processing module first performs a lens correction to remove any lens distortion. This calibration facilitates pixel-to-pixel comparison of the images by the processing module and correct angle to pixel shift conversions.

The processing module of the system and process of the present invention then performs a global image registration of the two images, using point based and area based pixilated image techniques and a perspective transform in the form of a 3×3 matrix, to align features that ostensibly lie on a plane which may be misaligned due to a change or variation in camera positions between images.

Either image may be the reference image in the development of the transform matrix, and the processing module applies the transform to the other image, bringing it into alignment with the first image. In generating the transform matrix, areas of highest anticipated maximum displacement, and areas where objects appear in one image but not in the other image, may be excluded. For example, if correspondence points are used to generate the transform matrix, points from areas of the image in the highest displacement regions are disregarded, using the remaining correspondence points to generate the transform matrix. As a practical example, if a tire is used on a paved surface to generate the load, the tire appears in one image but not the other. For purposes of global image registration and alignment of the images, the tire points and points near the tire should be disregarded.

Figure 3:
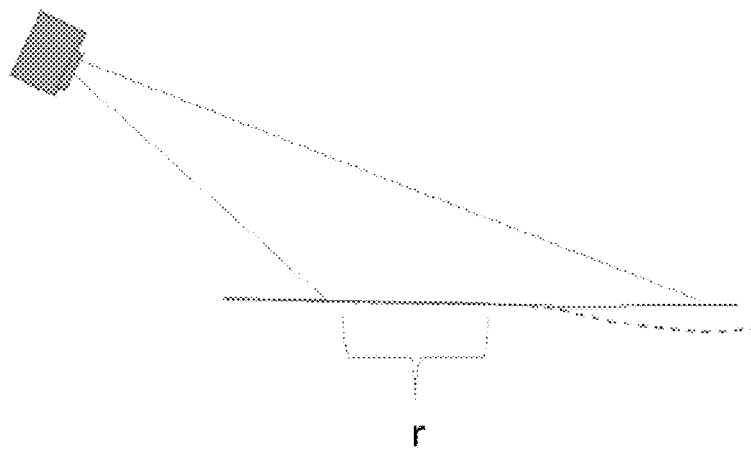
FIG. 3 shows a depiction of the undeflected region used to generate the perspective transform which is subsequently aligned (registered) by the perspective transform.
Figure 9:
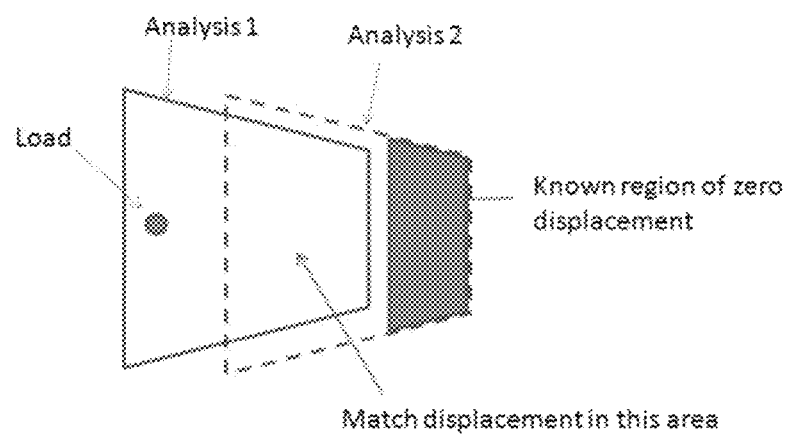
FIG. 9 is a depiction of cascading two measurements so that one of the two has a region of zero displacement.

When the system and process of the present invention is performed in a controlled environment, and displacement on a portion of the surface (typically outside of the region of interest) from the load is known or null (e.g., a certain distance from the load or region of interest; see, e.g., FIG. 3) and data relating to the same is input into the processing module, the global image registration process of the present invention may use pixel information from the area of zero/known displacement on the images to build the transform matrix represented by r in FIG. 3. Additionally or alternatively, in building the transform matrix the global image registration process may use pixel information from areas in the scene known to be planar, or where the topography of the surface or the region of interest is known and input into the processing module. Acceptable variations off the plane of the surface should be less than $1/20^{th}$ the distance from the camera to any point on the surface. In this embodiment the processing module builds the transform matrix from the differences in the nominally planar and unchanged topography region in either of the images to align with the same region in the other image; the matrix is then applied to the entirety of the other image, removing any error caused by misalignment of the cameras (see FIG. 9). By means of this process, image registration is completed before actual displacement in length values is calculated by the processing module of the present invention.

Figure 2:
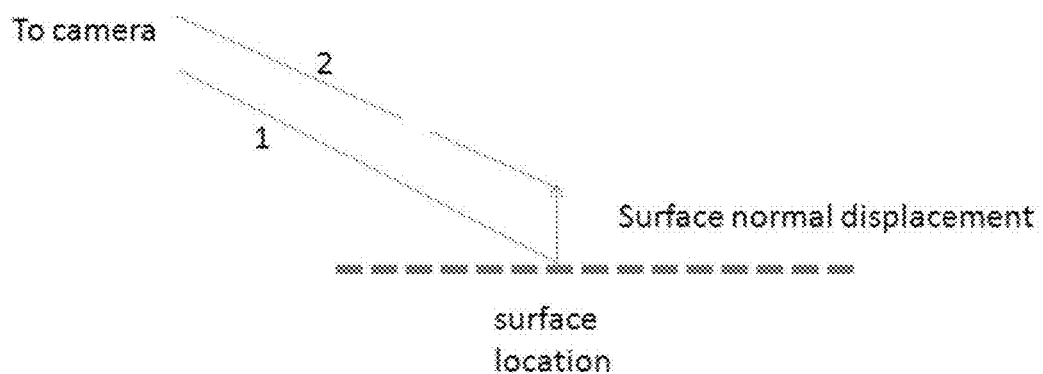
FIG. 2 depicts a pixel shift in the image plane useful in the systems and processes of the present invention; the position of a location on the surface shifts in this figure from line 1 to line 2. The vertical arrow represents the vertical deflection corresponding with the surface shift normal to the surface, as viewed by the camera in the singular case in which there is zero deflection in the plane of the surface.

Using the foregoing methods, the processing module of the system and process of the present invention may apply lens correction and image registration using the undeflected region or regions of known deflection in one operation, to produce aligned registered images with a known angular relationship between pixels and exterior angles. Using the aligned, registered images, and the known angular relationship between pixels and exterior angles, the processing module of the present invention now computes the vertical and horizontal pixel shifts which due to the surface incident angle represent vectors normal and planar to the surface (see FIG. 2) between the first image and the second image, using spectral, area and/or point based methods. This calculation may be performed for different or select regions of the image, or for the entire image, and produces two N×M arrays identifying x direction pixel shift and y direction pixel shift as distributed across the image of the surface.

In calculating pixel shift, each registered image may be subdivided into small units, and pixel shift between the images, in each small unit, may be calculated using frequency domain, spatial convolution, integration or correspondence points based methods. Because the deflection of the surface caused by the application of a load is of primary importance, pixel shift calculation may be limited to or near the region of interest. To increase the accuracy of the pixel shift calculation, sub-pixel resolution may be used (calculating the relative shift in each image subunit to less than a pixel).

The processing module of the system and process of the present invention then converts the displacement from pixels aligned normal and planar to the surface of the region of interest from pixel units to length units, using known geometry of the scene (e.g., spatial location of the camera from the surface can determine actual dimensions of the surface area in the image, which can be used to convert pixel units of the image into length units). In some embodiments the surface plane component of the pixel shift direction is set to zero so that a purely vertical (from the surface) displacement of the deflected surface corresponding to the angular pixel shift at that point can be converted into length units and used as the deflection normal to the surface.

Figure 5:
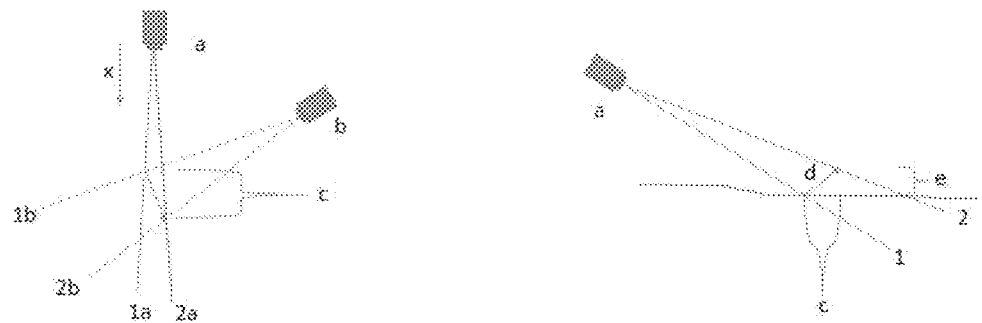
FIG. 5 shows a plane of surface pixel shift from top and side perspectives.
Figure 6:
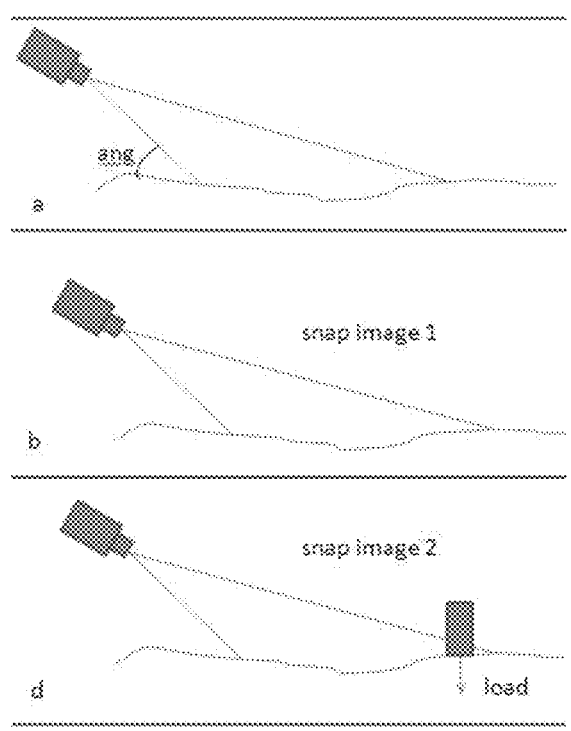
FIG. 6 depicts generally the process of capturing images for use in the process of the present invention.

In embodiments where a second set of images are captured from a different perspective than the first set of images, and these images are also corrected and registered by the processing module of the present invention, and the vertical and horizontal pixel shifts which align with normal and planar directions on the surface between the images are calculated, the displacements normal and planar to the surface may be computed by resolving the vectors determined from the vertical and horizontal pixel shifts from each set of images, in 3D space, and extracting the normal to surface and two horizontal (planar) components therefrom. An example of this process is shown in FIG. 5, depicting a first camera (a), a second camera (b), and the camera to pixel ray for each image set (1a and 1b being derived from the undeflected image for each camera a, b; and 2a and 2b being derived from the deflected image from each camera a,b). From these angles, the resolution of pixel shift in the plane of the surface in the direction x, aligned with the camera a, can be calculated (c). In the second image of FIG. 5 the normal displacement (e) is calculated from the undeflected vertical camera to pixel ray (1) and the deflected vertical camera to pixel ray (2), with the resolved planar pixel shift (c) hereinabove described, allowing for the calculation of the resultant displacement vector (d) from the vertical pixel shift between the undeflected and deflected rays (1) and (2).

In some configurations the processing module of the present invention applies lens correction, global image registration and pixel shift computation in one operation, to produce aligned registered images with a known angular relationship between pixels and exterior angles, and a displacement map.

The processing module of the present invention may then adjust the displacement map by computing the exterior angular displacement perpendicular to the vector from the surface element captured by the camera to the optical location of the pixel in the camera (the camera-surface ray), as determined from the pixel shift between the first and second images. The angular displacement may be resolved into physical displacement using the known surface shape and distance of the surface from the camera interior focal point.

In certain applications the processing module of the system and process of the present invention computes deflection upon loading in the surface normal direction only, which can be useful if the surface material is assumed to shift negligibly horizontally in the plane of the surface and deflection is purely normal. In these applications the pure normal displacement is calculated by determining the magnitude of such displacement that would be created from the measured angle shift (see FIG. 2).

Figure 4:
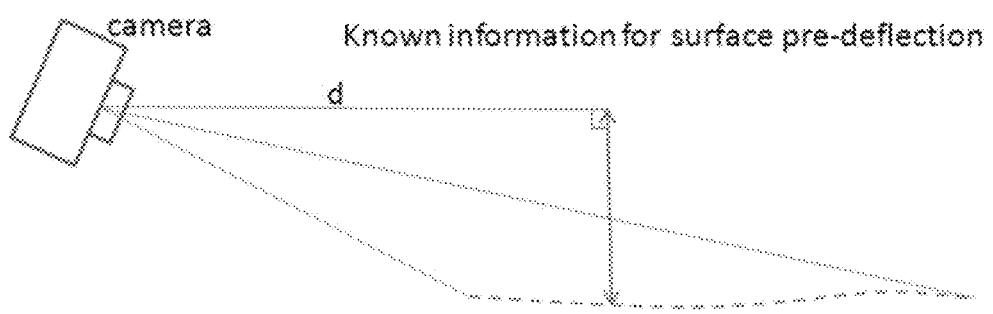
FIG. 4 shows the definition of known topography as integrated into the process of the present invention.

In embodiments of the present invention wherein multiple sets of images are captured, calibrated, and registered in accordance with the methods hereinabove described, from different perspectives or with different camera settings (FIG. 5), and further wherein the vertical normal pixel shift and horizontal planar pixel shift between said images within each set is calculated, the angular shift of the surface can be calculated using such independent set pixel shifts and the camera-surface ray, wherein the horizontal and vertical normal and planar angular shift of the surface from the different perspectives at each point on the surface can be combined to yield a single, absolute displacement vector from the intersection of the camera exterior projections for each image. From the absolute displacement vector, and using the height information (see FIG. 4), the surface normals and the magnitude of displacement can be calculated by the processing module.

Capturing and processing a plurality of image sets from different perspectives as hereinabove described may be particularly useful if one set of images does not provide a view large enough to capture a portion of the surface where deflection due to loading is zero or known and the horizontal planar or in surface deflection is negligible. In this application, a second or more sets set of images may be captured from a more distant perspective than the first set of images, wherein deflection of the surface is zero or a known value (see FIG. 9). The processing module may correct and register each set of images, using only the pixels in the region of known or zero displacement to build the registration transform matrix. An offset may then be generated and added as a pixel deflection computed from the spatial deflection to the first set of images to be used in the generation of the transform matrix for the second set of images so that the displacement determined from the first image set matches the displacement calculated from the second image set in overlapping regions. The vertical normal and horizontal planar pixel shift between the images of the first image set may then be calculated. This adjustment process may be repeated with additional image sets, from different perspectives. Preferably, each image used in this analysis includes the region of interest for near or greater than one-half of the image.

Figure 8:
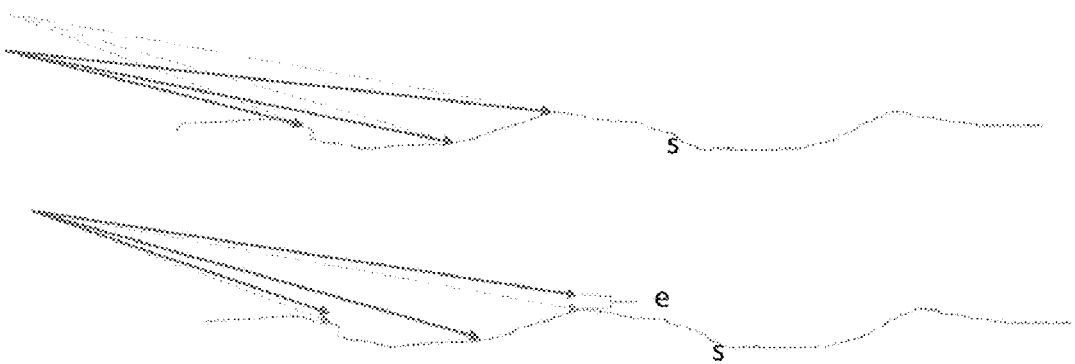
FIG. 8 is a graphic depiction of the error (e) introduced by using a perspective transform to correct and align features between two camera positions on a non planar surface.

In many practical applications the surface and the region of interest are not perfectly planar. To adjust for non-planar surfaces, the actual surface topography may be input into the processing module of the present invention, and the magnitude of displacement calculated by the processing module may be adjusted by the difference between the assumed planar topography and the actual surface topography at the region of interest. (FIG. 8)

The system and method of the present invention may be used with a trigger or other manual or automatic means to begin the process of capturing an image when the camera is in the same spatial position relative to the region of interest.

Figure 7:
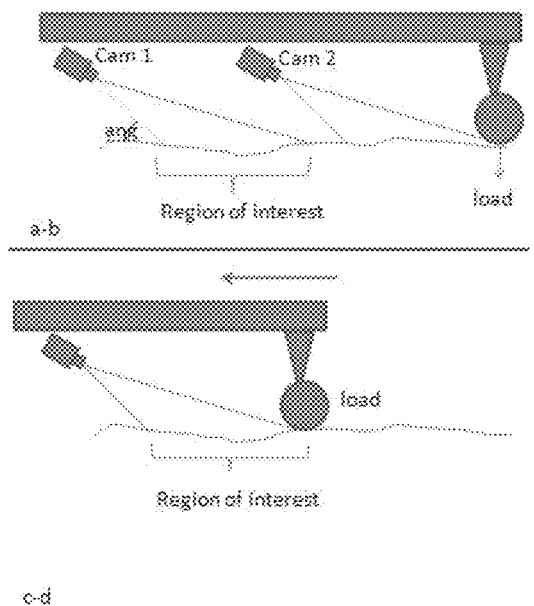
FIG. 7 depicts the system of the present invention installed and in use on a vehicle.

The system and methods of the present invention may be stationary, or moving. For example, as depicted in FIG. 7, two or more cameras may be arranged under and affixed to a truck flatbed to take images of the same section of pavement when it is not under load, and when it is under the load of the truck tire (and a portion of the load of the truck carried by the tire). Thereby, use of the process and system of the present invention could be used to determine rolling wheel deflections useful in pavement assessment. Similarly, two or more cameras may be arranged under and affixed to a train car to measure track deflection of railroad ties, or under a vehicle or airplane to measure deflection on an airport runway.

The invention claimed is:

1. A method for measuring displacement of a surface having a surface plane, at a region of interest, when the region of interest is exposed to a load, the method comprising the steps of:
   illuminating the region of interest of the surface;
   by means of a first camera having a lens with a focal ratio of at least f/5, wherein the first camera is positioned at a certain camera position relative to the surface so that an optical axis of the lens is oblique to the surface plane and an angular field of view of the lens includes a range of intersection angles with the surface between 5° and 45°, and by means of the first camera capturing a first image of the region of interest of the surface from a first perspective;
   applying a load perpendicular to the surface plane, near the region of interest;
   by means of a second camera with a focal ratio of at least f/5, wherein the second camera is positioned at the certain camera position relative to the surface so that an optical axis of the lens is oblique to the surface plane and an angular field of view of the lens includes a range of intersection angles with the surface between 5° and 45°, and by means of the second camera capturing a second image of the region of interest of the surface from the first perspective; and
   transmitting the first and second captured images to a processing module of a computer, wherein the processing module: aligns the captured images; computes pixel shift normal to the surface between the captured images for the region of interest; and from the computed pixel shift, computes physical displacement normal to the surface between the captured images;
   wherein the first and second cameras are fixed at a spatial distance apart on a movable structure such that by movement of the movable structure, after capturing the first image the first camera is moved from the camera position and the second camera is moved into the same camera position and captures the second image.

2. The method of claim 1, wherein the step of illuminating the surface comprises providing a light source at a light source position at an angle β relative to a surface normal vector at the region of interest, which angle β is less than a camera angle α between the optical axis of the camera lens and the surface normal vector.

3. The method of claim 1, wherein the processing module further performs perspective transform to generate a transform matrix based on pixel based information, excluding areas of highest anticipated maximum displacement and areas where objects appear in one captured image but not in the other captured image, and aligns the captured images by global image registration, applying the transform matrix to one of the captured images.

4. The method of claim 3, wherein the processing module further receives information that identifies an area of the surface with known displacement when the load is applied, and uses pixel information from the area of the surface with known displacement to generate the transform matrix.

5. The method of claim 3, wherein the processing module further receives topographical information regarding areas of the region of interest of the surface, and generates the transform matrix using the topographical information.

6. The method of claim 3, wherein the processing module further computes an exterior angular displacement perpendicular to the optical axis of the lens from the pixel shift between the captured images for the region of interest, and from the exterior angular displacement computes physical displacement of the region of interest between the captured images.

7. The method of claim 3, wherein the processing module further identifies an area of the surface with zero displacement in the same plane when the load is applied, and uses pixel information from the area of the surface with zero displacement to generate the transform matrix.

8. The method of claim 1, wherein the processing module further comprises data relating to the image capture, including the spatial position and field of view of the camera relative to the surface when the images were captured; and applies lens correction to the images to remove any lens distortion from the captured images.

9. The method of claim 1, wherein the processing module further computes pixel shift planar to the surface, between the captured images; and from the computed pixel shift, computes physical displacement planar to the surface of the region of interest.

10. A system for measuring displacement of a surface at a region of interest when the region of interest is exposed to a load, the system comprising:
two cameras for capturing images of a region of interest of the surface from a perspective, the cameras each being fixed at a spatial distance apart on a movable structure such that by movement of the movable structure, either camera may be positionable into a single spatial position such that at the time of image capture the camera capturing the image is in the spatial position, each camera having a lens with a focal ratio of at least f/5, wherein when the camera is positioned at the spatial position relative to the surface, an optical axis of the lens is oblique to the surface plane;
a load, wherein at least one of the images is captured by one of the cameras from the spatial position when the surface is not under the load, and at least one of the images is captured by the other camera from the same spatial position when the surface is under the load, and wherein the load is applied perpendicular to the surface plane near the region of interest; and
a processing module of a computer, wherein the processing module: receives the captured images from the two cameras; aligns the images; computes pixel shift normal to the surface and pixel shift planar to the surface between the captured images for the region of interest; and computes physical displacement of the surface at the region of interest from the computed pixel shift.

11. The system of claim 10, further comprising a light source to evenly illuminate the surface, wherein the light source is provided at a light source position at an angle relative to the surface normal vector at a point of interest, which angle is less than the angle between the optical axis of the lens at the spatial position and the surface normal vector at the point of interest on the surface.

12. The system of claim 10, wherein the processing module further aligns the images by generating a transform matrix based on pixel based information from areas in the images of known or zero deflection lying in the same plane, and using one image as the reference image, applying the transform to another image.

13. The system of claim 10, wherein the movable structure is a truck flatbed and the load is the portion of the truck supported by one tire, and further wherein one of the cameras is positioned at the spatial position to capture an image of a section of pavement when the section of pavement is not subjected to the load of the tire, and wherein by movement of the truck the other camera is moved to the spatial position to capture an image of the section of pavement when the section of pavement is subjected to the load of the tire.

14. The system of claim 10, wherein the movable structure is a train to measure track deflection of a railroad tie based upon the application of a load to the railroad tie.

15. The system of claim 10, wherein the movable structure is a vehicle or an airplane to measure deflection on an airport runway based upon the application of a load to the runway.

16. A system for measuring displacement of a surface at a region of interest when the region of interest is exposed to a load, the system comprising:
a first camera and a second camera, the first and second cameras being fixed at a spatial distance apart on a movable structure such that by movement of the movable structure, either camera may be positionable into a single spatial position such that at the time of image capture the camera capturing the image is in the spatial position;
a load to be applied to a region of interest of a surface, perpendicular to the surface, wherein the first camera is moved into the spatial position relative to the region of interest and captures one or more images of the region of interest when the load is not applied to the surface, and by movement of the movable structure the second camera is moved into the spatial position and captures one or more images of the region of interest when the load is applied to the surface; and
a processing module of a computer, wherein the processing module: receives the captured images from the first and second cameras; computes pixel shift normal to the surface and pixel shift planar to the surface between the captured images for the region of interest; and computes physical displacement normal to the surface and planar to the surface of the region of interest resulting from application of the load to the region of interest of the surface.

* * * * *